United States Patent [19]
Stahl

[11] 4,122,203
[45] Oct. 24, 1978

[54] FIRE PROTECTIVE THERMAL BARRIERS FOR FOAM PLASTICS

[76] Inventor: Joel S. Stahl, 746 Golfview Ave., Youngstown, Ohio 44512

[21] Appl. No.: 868,198

[22] Filed: Jan. 9, 1978

[51] Int. Cl.² ............................ B32B 5/16; B32B 5/18
[52] U.S. Cl. ........................................ 428/309; 252/2; 252/8.1; 427/222; 156/71; 156/77; 428/315; 428/322; 428/328; 428/921
[58] Field of Search ............... 428/275, 304, 309, 310, 428/315, 320, 321, 322, 328, 329, 330, 920, 921; 252/2, 4, 8.1; 427/222; 156/71, 77

[56] References Cited

U.S. PATENT DOCUMENTS

| | | | |
|---|---|---|---|
| 3,778,337 | 12/1973 | Mand et al. | 428/320 |
| 3,991,252 | 11/1976 | Kolakowski et al. | 428/921 |
| 4,015,386 | 4/1977 | Cook | 428/921 |
| 4,039,709 | 8/1977 | Newman | 428/322 |

Primary Examiner—William J. Van Balen
Attorney, Agent, or Firm—Maky, Renner, Otto & Boisselle

[57] ABSTRACT

A foamed polymeric material is coated with a fire protective thermal barrier product. The polymeric material, thus protected, is used for on-site application on walls, ceilings, decks and roofs of buildings. The thermal barrier product (hereafter "thermal barrier" for brevity) is also used to protect foam plastics in fire-resistant factory-made building panels, the exteriors of tanks and other vessels, and the coverings over pipes. The thermal barrier comprises a normally fluent thermosetting synthetic resinous material in which is dispersed an effective amount of hydrated magnesium sulfate and, optionally, inert inorganic fillers, pigments and the like. The thermal barrier is flowed or sprayed onto the foamed polymeric material, optionally, with an adhesive interlayer or "tie-coat" therebetween, to form a fire resistant laminate which laminate meets the "15-minute finish rating" or "hourly rated" requirement of building codes as determined by a testing procedure currently designated ASTM E-119-76, and other fire resistance requirements as determined by other fire resistance tests. A process is disclosed for utilizing compositions belonging to a family of thermal barrier products containing inorganic salts having water of crystallization which is driven off at a temperature from about 200° F but less than 600° F.

23 Claims, 6 Drawing Figures

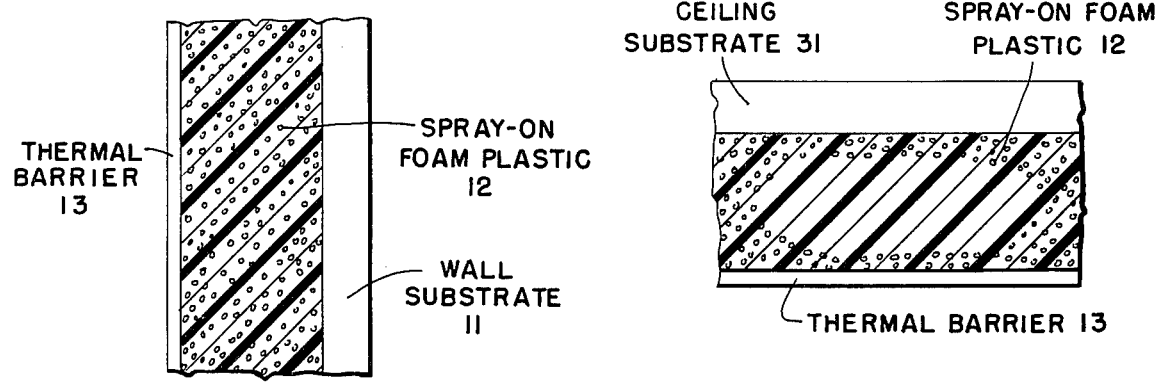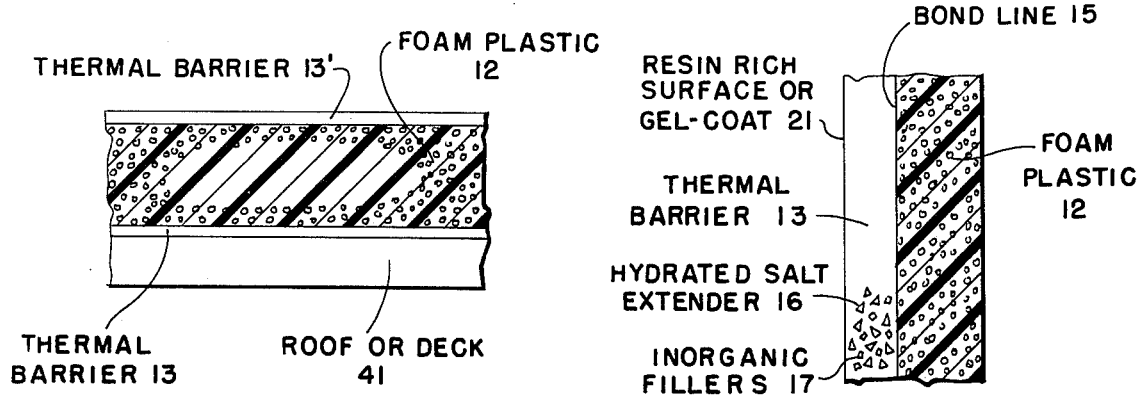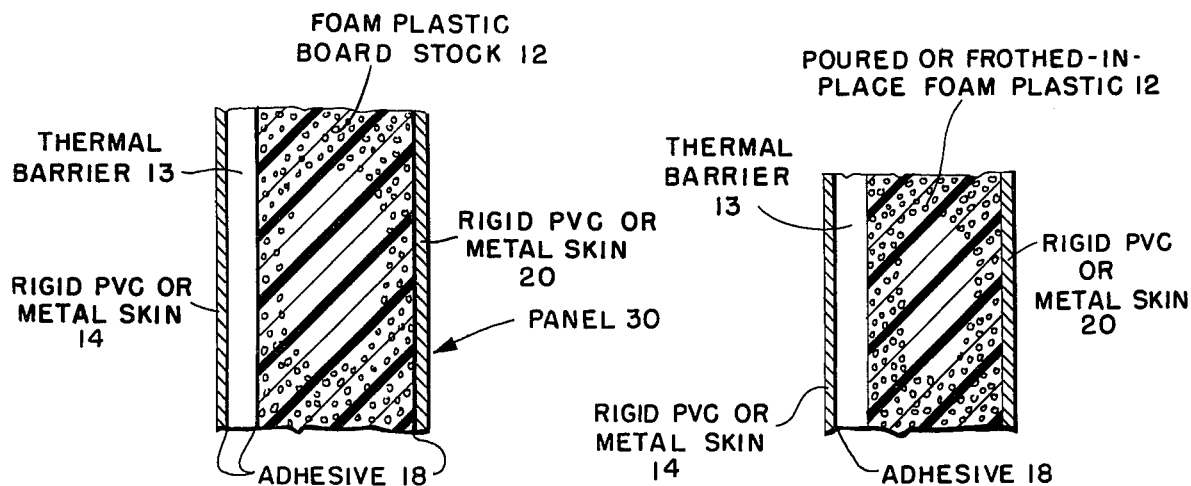

FIRE PROTECTIVE THERMAL BARRIERS FOR FOAM PLASTICS

BACKGROUND OF THE INVENTION

The necessity of decreasing energy consumption to heat and/or cool buildings has thrust foam insulation and factory-made foam core panels into the vanguard of desirable products. Foamed polymeric materials (commonly referred to as "foamed plastic" or "plastic foams" and hereinafter referred to as "foam plastics") have excellent thermal insulation properties and are exceptionally well-suited for use in mass-produced or factory-made panel systems such as are used for wall and roof/ceiling assemblies and also for on-site applications in buildings, on walls, ceilings, decks, roofs, exteriors of tanks and vessels, coverings over pipes, and the like.

Although excellent from an insulation viewpoint, the fire performance of foam plastics has generated deep concern which is not dispelled by continual scattered incidents which have taken their toll. This toll has been attributable in part to the combustibility of the foam plastics, and in part to the generation of smoke and toxic gases due to fire involvement. Accordingly, all model building codes have been amended to ensure a judicious selection and use of the foam plastics.

Much effort has been directed to the problem of making foam plastic structural panels safe when exposed to fire. Numerous journal articles have elaborated on solutions to the problem, and some patents have issued describing improvements in the field of fire protection of rigid foam plastics, particularly those used in the building industry. Among the more recently issued U.S. Patents are the following U.S. Pat. Nos. 3,320,077; 3,718,532; 3,816,234; and 3,967,033.

In particular, U.S. Pat. No. 3,967,033 to Robert E. Carpenter is stated to be directed to a fire resistant panel designed to meet requirements stipulated in a testing procedure designated ASTM E-119-73. Fire retardancy or "flame spread rating" is defined as: a measurement of the speed of flame travel across a given surface in accordance with a testing procedure designated ASTM E-84 (also referred to as "the 10-minute Steiner Tunnel Test"). Some prior art panels have an acceptable flame spread rating and are deemed fire retardant, but have unacceptable fire protection. Fire protection is numerically quantified by a "fire endurance (fire resistance) rating" defined as: a determination of the time it takes for a given material or assembly of materials to reach a failure point, based on a testing procedure designated ASTM E-119-76 (a controlled, actual fire exposure). Thermal barrier products of this invention are both fire retardant and fire resistant.

It should be noted that several conventional products provide fire retardance and fire resistance. Among them are gypsum plaster, magnesium oxychloride, Portland cement plaster, concrete, mineral fibers and mastics. In addition, there are lightweight aggregates such as perlite, mica, glass fibers, glass beads, and vermiculite inter alia, some of which may be used with a binder. Most of these products have limitations. The ones that are water-based take several hours to cure, and after curing, are porous, with a resultant loss of some properties such as adhesion and protection against water vapor transmission. Thick coatings are heavy and characteristically exhibit inadequate initial and post-cure adhesion to foam substrates. In some cases the coatings crack and spall because durability, hardness and impact properties are inadequate. Many of these prior art products have poor water vapor transmission properties, that is, they lack protection against water vapor, and permit water degradation of the plastic foam substrate.

Commonly, because of the foregoing problems, building codes require that foam plastic insulation be protected by a ½ inch (0.5 in) thickness of gypsum wall board or other material which will limit the temperature rise of the foam plastic surface to not more than 325° F. after 15 minutes exposure to the ASTM E-119-76 standard time-temperature curve. However, the thermal barrier must remain in place during the test, and this usually requires the extensive use of fasteners which is not economical. Metal clad panels with foam plastic cores are covered by the requirements of building codes and therefore a thermal barrier interposed between the foam plastic and the metal cladding is also desirable. The thermal barrier of this invention is particularly well suited for such uses.

It is known that aluminum trihydrate in a polyester resin composition functions as a flame retardant. Upon heating, aluminum trihydrate (about 35% by weight water) releases water of crystallization at about 600° F. in the form of steam, lowers the surface temperature, and thus retards flame propagation. Magnesium oxychloride (about 54% by weight water) also releases its water when heated at about 600° F. In economical thermal barrier thicknesses, these temperatures at which aluminum trihydrate and magnesium oxychloride release the water of crystallization is too high to fire protect foam plastics which begin to decompose at much lower temperatures. The precise decomposition temperature of a foam plastic will vary depending upon its chemical and physical properties. The decomposition temperature of polyurethane foams will typically range from about 300° F. to about 350° F.; polyester foams will range from about 275° F. to about 375° F.; and polystyrene foams will range from about 200° F. to about 300° F. All conventionally used plastic foams decompose at temperatures substantially below 600° F. At about 325° F., thermoset polyurethane foams act as thermoplastic foams and begin to lose their physical properties.

To cope with the problem of relatively low decomposition temperatures characteristics of commercial foam plastics, water fillable polymers were evaluated for fire resistance by ablation when exposed to fire. Such water fillable polymers are disclosed in "Water Fillable Polymers - Ablative Material for Fire Resistance" by J. P. Davidson, et al., California University, 1973, published by National Technical Information Service, U.S. Department of Commerce, Springfield, Va. 22151.

A similar thermal barrier which releases water at a relatively low temperature is a solid water-in-oil emulsion wherein the continuous phase is a thermoset polymerization product of an unsaturated linear polyester and a vinyl monomer cross-linking agent disclosed in U.S. Pat. No. 3,967,033; except that the water is not chemically bound and can be lost under end-use conditions. Besides the resultant loss in fire resistance, the water loss will adversely affect the plastic foam substrate and metal skin covering it. Such water extended polyester thermal barrier is not recommended for use over foam when the thermal barrier is left exposed.

SUMMARY OF THE INVENTION

A family of fire protective thermal barrier products is provided over a foam polymeric material which is protected from fire. The thermal barrier product (hereafter "thermal barrier" for brevity), is used in a panel which comprises transversely spaced apart, generally coextensive first and second outer skin members having an inner core of insulating polymeric material. The core comprises the foam polymeric material (hereinafter referred to as "foam plastic") at least one side of which is coated with a comparatively thin layer of a thermal barrier. Optionally, an adhesive interlayer or "tie-coat" may be used between the foam plastic and the thermal barrier to provide a better bond therebetween. For field-applied foam plastic on buildings, tanks and pipes, the thermal barrier is sprayed on the surface of the foam plastic.

The thermal barrier comprises a continuous phase of a flowable or sprayable synthetic resinous material in which is substantially uniformly dispersed an inorganic salt of a Group II A element of the Periodic Table selected from the group consisting of magnesium, wherein the salt has in excess of 35 percent by weight (% by wt) of chemically bound water of crystallization, a major portion, and preferably essentially all of which is driven off when the salt is heated to a temperature from about 200° F. but below about 600° F.

It has more specifically been discovered that magnesium sulfate heptahydrate ($MgSO_4 \cdot 7H_2O$), economically available as epsom salts, contains a desirably high level of water of crystallization most of which is given up at about 392° F., and that finely divided $MgSO_4 \cdot 7H_2O$ crystals, smaller than about 20 U.S. Standard mesh (840 microns), have uniquely desirable physical properties which provide multiple functions of resin extender, fire resistance provider and flame retardant in the thermal barrier.

It is therefore a specific object of this invention to provide a thermal barrier composition comprising a fluent liquid polymeric material continuous phase, in which is dispersed from about 30% by wt to about 80% by wt of finely divided crystalline $MgSO_4 \cdot 7H_2O$ having crystals in the size range from about 10 mesh (2.0 mm) to about 325 mesh (44 microns) and preferably in the size range from about 20 mesh (0.84 mm) to about 200 mesh (74 microns).

It is another specific object of this invention to provide a thermal barrier having dispersed therein a hydrated crystalline inorganic salt in which water of the crystallization is present in excess of 35% by wt of the salt, which thermal barrier has low water permeability and low water vapor transmission (WVTR) per ASTM E96-66, a test at 100° F. and 90% humidity, in order to protect a moisture-sensitive foam plastic insulating material to which the thermal barrier may be bonded. In particular, a thermal barrier 0.135 in. thick, of 40/60 polyester containing $MgSO_4 \cdot 7H_2O$, provides a "perm rating" of 0.0295.

It is a further specific object of this invention to provide a thermal barrier comprising a polyester continuous phase having dispersed therein from about 30% by wt to about 80% by wt, and preferably from about 50% by wt to about 60% by wt of finely divided crystalline $MgSO_4 \cdot 7H_2O$, which polyester, when cured, bonds to a foam plastic, optionally with a "tie-coat", and holds the $MgSO_4 \cdot 7H_2O$ in the polyester which is thus simultaneously extended or filled, and, protected against fire, without the application of additional barrier coatings. The fire protective function of the thermal barrier is attributable to the release of the water of crystallization at a temperature in the range from about 200° F. but below 600° F.

It is still another specific object of this invention to provide a dual function moisture and thermal barrier for a foam plastic, which barrier is hard, durable and has high impact resistance so that it can be used as an interior wall surface, or as an exterior coating for roofs, tanks, pipelines and the like; which barrier is either self-adhered or bonded to a plastic foam without fasteners, even when flowed into a joint of adjacent panels; which barrier meets the 15-minute finish rating as determined by the ASTM E-119-76 test procedure and other fire resistance tests, even when the $MgSO_4$-containing polyester is further extended with cementitious fillers, finely divided silica, pigments and the like. A nominal 0.125 in. thickness of cured thermal barrier with 40 parts by wt polyester and 60 parts by wt finely divided $MgSO_4 \cdot 7H_2O$ withstands 20 in-lbs of impact as determined by the Gardner Drop Dart impact test.

It is yet another object of this invention to provide a thermal barrier, as described hereinbefore, which lends itself to being tailored for application and curing within a preselected period of time, with predetermined proportions of a hydrated inorganic salt and catalyst dispersed therein, and, optionally, promoters, viscosity modifiers, fillers, pigments, weathering agents and the like.

These and other objects and advantages of the present invention will be apparent from the following description, reference being made to the accompanying drawing wherein preferred embodiments of the present invention are diagrammatically illustrated.

BRIEF DESCRIPTION OF THE DRAWING

In the several figures, like numerals refer to like elements shown.

FIG. 1 is a fragmentary cross sectional view of a building wall wherein a novel laminate is applied which laminate comprises sprayed-on foam plastic insulation protected by a thermal barrier which is self-adheringly bonded to the foam plastic, that is, no tie-coat is used between the barrier and foam plastic. The thermal barrier contains inorganic additives or fillers, including a hydrated extender and other inorganic fillers, shown greatly enlarged for clarity.

FIG. 2 is a framentary cross sectional view of a laminate comprising foam plastic and thermal barrier as applied to a ceiling.

FIG. 3 is a fragmentary cross sectional view of a laminate comprising foam plastic sandwiched between upper and lower thermal barriers, as applied to a roof or deck.

FIG. 4 is a fragmentary cross sectional view of a portion of the laminate shown in FIG. 1, showing on a greatly enlarged scale, the distribution of the hydrated extender and other fillers in the thermal barrier, and a resin-rich surface or gel coat.

FIG. 5 is a fragmentary cross sectional view of a structural panel of this invention, in which panel an adhesive or tie-coat binds the thermal barrier to an inner foam plastic core of polyurethane or polystyrene premanufactured board stock sandwiched between outer skin and inner skins of rigid polyvinyl chloride (PVC), or metal.

FIG. 6 is a fragmentary cross sectional view of a structural panel having a foamed-in-place foam plastic core, and the thermal barrier is self-adhered to the core without the use of an adhesive.

DETAILED DESCRIPTION OF PREFERRED EMBODIMENTS

The following description is particularly directed to a factory-made panel of a building, which panel is provided with a bonded thermal barrier. More particularly, it is directed to a factory-made panel of the type which is used as a basic building module designed for use as a fire protective insulating wall member having a code-acceptable fire rating. Still more particularly, it is directed to a building panel utilizing a rigid foam plastic core to which is laminated a thermal barrier so as to form a rigid laminate which will meet building code requirements as determined by testing procedure ASTM E-119-76, and other fire resistance tests, and particularly the "15-minute finish rating". In the E-119 test procedure, a panel is exposed to a controlled temperature gradient starting at room temperature, going to 1000° F. in 5 mins, and to 1400° F. at 15 mins. A panel passes the test when the temperature of the interface between the thermal barrier and the foam plastic does not exceed 325° F. after the 15 minute exposure. In addition, the thermal barrier of the laminate must remain in place during the test. Clearly, passing the test or not, depends on the effectiveness of the thermal barrier. It will be appreciated that, the novel thermal barrier utilized in this invention is especially adapted for us with rigid foam plastics such as are used for on-site application on walls, ceilings, decks and roofs of buildings, exteriors of tanks and vessels, and coverings over pipes.

From the foregoing discussion is will be evident that giving off water at about 600° F. affords the foam plastic inadequate protection. It has now been found that it is much better to use a salt which releases its water of crystallization at from about 200° F., but at a lower temperature than 600° F. Further, the salt which functions as a hydrated extender should be fully compatible, physically and chemically, with the continuous phase in which it is dispersed, so that the salt can be held, uniformly distributed therein, without reacting with the continuous phase. Moreover, under fire conditions the salt should not give off by-products which are toxic to humans.

Preferred inorganic salts which may be used as hydrated extenders include those crystalline salts of elements which have associated with them at least 35% by wt water of crystallization, essentially all of which is driven off at a temperature below 600° F., and preferably in the range from about 200° F. to about 400° F. More preferred are the hydrated salts of Group II A elements of the Periodic Table, particularly magnesium, which are economically available, and which, upon exposure to high heat or fire, give up their water of crystallization without giving off toxic fumes. Examples of such salts are magnesium sulfate heptahydrate ($MgSO_4.7H_2O$); magnesium sulfite ($MgSO_3.6H_2O$); and magnesium monohydroorthophosphate ($MgHPO_4.7H_2O$). Most preferred is $MgSO_4.7H_2O$ which releases 70% of its water of crystallization at about 302° F. and about 85% of its water of crystallization at about 392° F. As mentioned hereinabove magnesium oxychloride gives up water at about 600° F., which temperature is too high in a practical or economical thickness of thermal barrier.

It is essential that the hydrated salt extender be in finely divided crystalline form, in a size range smaller than about 10 U.S. Standard mesh and larger than about 325 mesh, and more preferably in the size range from about 20 mesh to about 200 mesh. The amount of hydrated extender used is not critical but depends upon the thickness of thermal barrier used, the amount of water in the extender, and the precise degree of fire protection to be imparted a laminate. Useful amounts of hydrated extender range from about 30 parts by wt to about 80 parts by wt per 100 parts of combined continuous phase and hydrated extender, a preferred range being from about 50 parts to about 60 parts by wt. It will be evident that it is desirable to use as much hydrated extender and as little synthetic resin in the continuous phase as possible, without sacrificing the fire protection of the panel, or the handling properties of the thermal barrier before it is cured.

A preferred thickness of thermal barrier is in the range from about 0.0625 in. to about 0.25 in., and typically about 0.125 in. is used. The particular polymeric material chosen for the continuous phase is not critical provided it is compatible with the hydrated extender to be dispersed in it and the particular surface to which it is to be applied. Preferred polymeric materials are synthetic resinous materials such as the polyesters, polyurethanes, and thermosetting polyacrylates, various urea-formaldehyde resins, epoxy resins, and the like. Most preferred are the flexible thermosetting polyester resins which have good corrosion resistance and good outdoor weathering properties.

Where a polyester, or other catalyzable resin is used as the continuous phase, the level of catalyst, promoter and other modifiers may be varied to provide a preselected curing cycle from as little as about 30 seconds to many hours. With a polyester, a peroxide catalyst such as methyl ethyl ketone peroxide or benzoyl peroxide is used in concentrations from about 0.75% to about 3%; optionally, a cobalt organometallic promotor is used in the range from about 0.3% to about 0.7%. For speedy curing the thermal barrier may be heated to a temperature in the range from about 90° F. to about 150° F.

In addition to the inorganic salt hydrated extender used in the continuous phase, additional additives may be incorporated; for example, additional extenders, or fillers, such as those disclosed in Stahl U.S. Pat. No. 3,389,196. Though the hydrated extender is a filler, the term "filler" as used hereinafter in this specification, for clarity, is used to refer to inorganic materials which have no chemically bound moisture which is heat releasable. Preferred fillers are siliceous materials such as finely divided silica and/or cementitious materials such as Portland cement. The amount of these fillers used is not critical provided the amount does not adversely affect the curing, bonding and fire protective properties of the thermal barrier. In many instances no such fillers are used, but in others, up to about 15% by wt of the thermal barrier may be provided by one of more fillers. Presence of these fillers in the thermal barrier usually enhances the density and hardness of the cured thermal barrier and assists in the processability of the uncured material.

To improve the flow properties of the thermal barrier and to increase its adherence, when wet, to a foam plastic, viscosity modifiers or thixotropic agents such as fumed silica and/or commercially available Cabosil or Aerosil, may be added in an amount so that the total hydrated extender and fillers range up to about 70% by weight of the thermal barrier mixture. The thixotropic agent also facilitates spraying of the thermal barrier with a conventional spray gun, such as Binks 18 N, in which extended and filled continuous phase resin is forced through a central orifice, and catalyst is forced through several surrounding orifices to be mixed into the resin. Addition of a viscosity reducer such as triethyl phosphate (TEP), or styrene monomer to the continuous phase resin also improves flowability and helps a small but desirable amount of resin to rise to the surface of the thermal barrier, so that upon curing, the resin forms a continuous surface seal for the solids in the resin. A thin gel coat may be sprayed onto the resin at the conclusion of the application to ensure a surface seal.

The thermal barrier may be applied to any conventional foam plastic, either directly by flowing or spraying the uncured thermal barrier onto the foam plastic and forming a self-adhering bond upon curing, or by using a tie-coat. The thickness of foam plastic depends upon the heat loss specifications of the structure in which the foam plastic is to be used, and the particular physical properties of the plastic foam chosen. Commonly used foam plastics include polyisocyanurates, urea-formaldehyde resins, polystyrene and polyurethane, the latter being preferred.

The thermal barrier may be flowed onto a horizontal foam plastic, or the thermal barrier may be metered onto an outer skin member with a doctor blade or reverse roll to provide uniform thickness. The barrier may be partially or fully cured before flowing upon it a plastic material, which when it expands and is cured, results in a foam plastic. Alternatively, the thermal barrier may be sprayed onto foam plastics which are applied to surfaces of ceilings, decks, roofs and walls, or curved surfaces such as those presented by storage tanks, pipelines, and other structures to be protected from fire by a thermal barrier.

Referring now to the drawings, there is diagrammatically illustrated in FIG. 1 a portion of an embodiment of this invention, comprising a wall substrate backing member 11, a spray-on plastic 12 and a thermal barrier indicated generally by reference numeral 13. The substrate backing member 11 is generally an existing wall, ceiling, deck or roof of a building, and the thermal barrier and foam plastic form a laminate on the substrate. The substrate backing member may be replaced with a relatively thin, flexible, self-supporting sheet. The laminate, comprising the foam plastic core 12 and, bonded thereto, the thermal barrier 13, without a substrate, may be used to protect pipe and vessels of all types including storage tanks.

The choice of foam plastic core 12 is determined by the contemplated specific end use of the laminate; the polymeric material for the foam and its physical properties will be chosen according to whether the laminate is to be used for a wall, ceiling, deck, roof, factory-made panel, exterior of tank, vessel or pipe. In general it is desirable to use a rigid foam plastic, that is, a foam which has a flame spread rating of 75 or less and a smoke density rating of 450 or less in accordance with ASTM E-84-1977. Preferred foams include those of the type produced from polystyrene, which foams have a density from about 1 to about 3 pounds per cubic foot (lbs/ft$^3$); and, polyurethanes, having a density in the range from about 2 to about 16 lbs/ft$^3$. Most preferred are polyurethane foams having a density in the range from about 2 to about 4 lbs/ft$^3$ which can be sprayed-on, poured-in-place, or frothed-in-place.

The thermal barrier 13 is essential to provide fire resistance prescribed by the ASTM E-119-76 test. It also enhances the appearance of the laminate where no outer skin is bonded to the thermal barrier. It is essential that the thermal barrier not crack or spall, upon standing, at ambient conditions; and that, when bonded to the foam plastic core 12, it remain in place during the test referred to. It is most preferred to choose the foam plastic core and thermal barrier so that they form, upon curing, a self-adhering bond when applied in contact with each other.

Since, desirably, the thermal barrier comprises a polymeric resinous material as the continuous phase which, by itself, has poor fire resistance properties, it is critical that the thermal barrier include an inorganic additive (not shown in FIG. 1) dispersed therein to provide the requisite fire resistance. The continuous phase is preferably a thermosetting resin, and most preferably a flowable polyester or epoxy resin, optionally reinforced with inorganic fibrous and particulate materials. As is known, epoxy resins are ether polymers usually containing p-phenylene groups as well as alcoholic OH groups; and, polyester resins consist essentially of the reaction product of a dibasic acid and dihydric alcohol dissolved in a polymerizable monomer.

Referring now to FIG. 2 there is shown a portion of a ceiling substrate 31, to the lower surface of which is applied a spray-on foam plastic 12, and to which in turn is spray-coated the thermal barrier 13.

Referring now to FIG. 3 there is shown a portion of a roof or deck substrate 41, to the upper surface of which is applied a first thermal barrier 13. Thereafter a board stock or spray-on foam plastic is applied onto thermal barrier 13, and finally, a second thermal barrier 13' is applied to the foam plastic 12. It will be evident that for installations, a single thermal barrier will suffice, whether it be the second thermal barrier 13' or the first 13.

Referring now to FIG. 4, there is shown a fragmentary cross sectional view of a portion of the laminate comprising the thermal barrier 13 self-adherently bonded along a bond line 15 to the foam plastic 12. The thermal barrier is shown to include the inorganic additive dispersed therein as a particulate material shown greatly enlarged. This particulate material includes a hydrated salt extender symbolized by triangles identified with reference numeral 16, and, optionally, an inorganic filler symbolized by circles identified with reference numeral 17. Whether or not the filler is included, the hydrated extender provides the required fire resistance of the laminate. The most preferred hydrated extender is crystalline $MgSO_4.7H_2O$ in the size range from about 20 mesh to about 200 mesh, which size range provides exceptional rhelogical compatibility of hydrated extender and resin so that the material can be handled with commercially available equipment. Preferably a resin-rich surface 21 should be deposited by allowing resin to rise to the surface, or by applying a gel coat.

Referring now to FIG. 5 there is shown a sandwich panel identified generally by reference numeral 30, having foam plastic core or board stock 12, between inner skin 14 and outer skin 20. The inner and outer skins 14 and 20 may be formed from any suitable conventional structural material such as steel, fiber-reinforced synthetic resin sheet, rigid PVC sheet, asbestos and the like. Thermal barrier 13 is bonded to foam plastic 12, optionally with an adhesive tie-coat or interlayer 18. Similarly it may be desirable to bond the thermal barrier 13 to inner skin 14 with adhesive 18. The adhesives 18 used may be the same or different, and the choice of such adhesives is well-known to those skilled in the art. Whether or not an adhesive or tie-coat is used, thermal barrier 13 is integral with the foam core.

Referring now to FIG. 6 there is shown a portion of a construction, analogous to that described hereinabove for FIG. 5, except that the foam plastic core 12 is poured-in-place or frothed-in-place, and requires no adhesive at the bond line of foam plastic and thermal barrier, or between foam plastic and outer skin. In the core 12 may be provided electrical wiring, plumbing conduits and the like, together with fittings (none of which are shown in the drawings) such as are described in the prior art, and particularly in the Stahl U.S. Pat. No. 3,707,165.

The following examples illustrate in greater detail how the present invention provides (i) a fire-protective thermal barrier obtained by curing a liquid, thermosetting synthetic resinous material in which is dispersed from about 30% to about 80% by wt of crystalline $MgSO_4 \cdot 7H_2O$, and (ii) a foam plastic core, to which the thermal barrier is bonded.

EXAMPLE 1

A fluent thermal barrier mixture is prepared as follows:

A high quality isophthalic polyester resin having a specific gravity of 1.09, viscosity in the range 275–325 LVF when measured with #2 spindle at 12 RPM and a cured Barcol hardness of 60 minimum at 65 min., is used as the continuous phase for magnesium sulfate heptahydrate ($MgSO_4 \cdot 7H_2O$) which is in crystal form having a density of 1.6, hardness of 2–2.5 Mohs, and a heat capacity at 291°–319° F. of 89 cal/(deg)(mol). In the commercial technical grade, 65% goes through a 40 mesh screen, 25% goes through a 20 mesh screen and 10% goes through a 10 mesh screen. It is necessary to grind this material so that all of it goes through a 20 mesh screen in order to be able to pump resin containing the crystals through commercially available equipment, and to disperse the crystals uniformly in the continuous phase. A mixture comprising 40 parts by weight resin and 60 parts by weight magnesium sulfate is continuously mixed and recirculated to keep the magnesium sulfate in suspension. This mixture is then pumped with an air driven reciprocating pump through the central orifice of a "Binks 18N" spray gun while 1% methyl ethyl ketone peroxide (MEKP) catalyst is mixed in the nozzle head by being air atomized through several surrounding orifices to get the intimate contact desirable for proper curing.

A panel is prepared as follows:

The catalyzed resin, in a thickness of about 0.125 inch, is flowed onto a polyester adhesive tie-coat preapplied to a 22 gauge steel sheet. Upon curing a hydrated $MgSO_4$-filled thermal barrier is bonded to the steel sheet by the tie-coat. A foam plastic core is subsequently formed-in-place against the thermal barrier and another steel sheet and the laminate of foam plastic and thermal barrier forms the inner core of a factory-made building panel which meets fire resistance requirements as determined by the ASTM E-119-76 test method or other fire resistance tests. In use, the building panel presents the metal skin with thermal barrier as being interiorly disposed, that is, providing the interior wall, or ceiling surfaces of a room of a building.

EXAMPLE 2

Preparation of a thermal barrier mixture containing silica to provide a total of 69.4% by wt total inorganic additives and 30.6% by wt polyester resin:

In a manner analogous to that described in Example 1 hereinabove, to the "40/60 mix" of polyester resin containing hydrated magnesium sulfate, there is added an inorganic filler, such as finely divided silica having primary particles smaller than about 20 mesh in size, and preferably smaller than 80 mesh in size. Sufficient silica is added so that the solid inorganic additives in the resin provide 69.4% by wt of the mixture including styrene monomer which is added to maintain sufficient viscosity to keep the mixture in a pumpable state. This mixture is then pumped with an air driven reciprocating pump through a "Binks 18N" spray gun, as before, through the center orifice while 1% MEKP catalyst is mixed in the nozzle head.

Preparation of a laminate comprising thermal barrier and foam plastic:

The mixed resin and catalyst is now sprayed onto a foam plastic on a vertical wall in a thickness of about 0.0625 in. and cures to form a thermal barrier which becomes a permanent wall surface which will protect the foam plastic.

A sandwich panel is constructed as follows:

The aforedescribed thermal barrier mixture containing 69.4% by wt of hydrated extender and filler combined is sprayed onto a tie-coat preapplied to a first 22 gauge steel sheet, and upon curing is bonded thereto. The aforedescribed mixture is sprayed onto a tie-coat preapplied to a second 22 gauge steel sheet. A foam plastic core is subsequently foamed-in-place against the thermal barrier, preferably before it is fully cured. A sandwich panel is thus constructed having two thermal barriers, one on the inside surface of each metal sheet which form the inner and outer skins of the sandwich panel. In an analogous manner sandwich panels are constructed in which one or both steel sheets are replaced with PVC sheets from about 15 mils to about 50 mils thick.

EXAMPLE 3

Preparation of thermal barrier utilizing a two-part resin mixture:

In a manner analogous to that described in Examples 1 and 2 hereinabove, the same mixture which contains 60 parts by wt hydrated magnesium sulfate, 40 parts by wt resin, and sufficient fine silica to provide 69.4% by weight of hydrated extender and filler combined dispersed in the resin, is used in a two-part mixing procedure wherein separate tanks hold each part of resin mixture. In one part of resin, prior to forming the thermal barrier, there is additionally mixed all the catalyst required to cure the resin in both tanks; and in the other part of resin there is provided all the promoter, such as a cobalt organometallic compound, or any suitable free radical initiator, to promote the resin in both tanks.

Each part of resin held in a separate mixing tank, is suitably agitated to keep the solids dispersed, and each tank is provided with a set of rotary pumps which are so connected as to flow equal amounts of each resin part into a mixing head such as a Stata-tube motionless mixer. One tank has added to it 2% MEKP catalyst, the other has added to it an effective amount of cobalt promoter sufficient to cure the resin in a predetermined period of time. The Stata-tube mixer comprises several modular sections enclosed in a tubular housing in which resin from the two tanks is intimately mixed, and promptly dispensed. From the Stata-tube mixer, the two-part resin mixture is flowed onto a substrate in a preselected thickness, about 0.125 in. thick, being metered with a doctor blade to distribute a uniform layer. Typically, the substrate may be either a flexible or rigid self-supporting sheet of plastic material, such as polyvinyl chloride from about 15 mils to about 50 mils thick, to which an adhesive has been previously applied. Restraining bars of wood, about the thickness (2 in) of the finished sandwich foam plastic building panel to be formed, are placed at the marginal edges of the substrate to contain the thermal barrier mixture. When cured the two-part resin mixture provides a fire resistant thermal barrier for a foam plastic core to which it is bonded. The wood restraining bars also function as "surrounds" when, later, foam plastic is foamed-in-place. The wood restraining bars are kept as part of the construction and become perimeter structural members of the building panel.

Further variations of methods for forming a laminate of foam plastic and thermal barrier, incorporating in addition, viscosity modifiers, pigments, other additives and gel coats or other finishing coats will be evident to those skilled in the art. Such a laminate can be used as an alternative to foam insulation covered with surfaces such as wood paneling and gypsum wall board in wall and roof assemblies.

EXAMPLE 4

A one-hour fire-rated panel assembly:

An assembly of plural sandwich panels containing the thermal barrier mixture, both as described in Example 2 hereinbefore, is constructed, in which assembly the panel joints are also filled with the same thermal barrier mixture. A ceramic fiber blanket may be inserted in the joints in place of, or in addition to, the thermal barrier flow into the joints. Each panel is provided with a thermal barrier from about 0.125 in. to about 0.25 in. thick on the inside of the inner and outer skins of the sandwich panel containing foam plastic insulation.

In addition to meeting the fifteen minute finish rating, this assembly can also meet a one-hour fire endurance rating as determined by ASTM E-119-76 fire resistance test. For one hour ratings the test requires at least one hundred square feet of wall, such as is presented by this assembly of sandwich panels, to be exposed to furnace temperatures as follows: For the first 5 minutes from room temperature to 1000° F., and then during the next 55 minutes from 1000° F. to 1700° F. In addition, the panel assembly is subjected to a pressurized water stream for 1 minute as indicated in the ASTM E-119-76 test procedure to assure that the water does not pass through the assembly.

The embodiments of the invention in which an exclusive property or privilege is claimed are defined as follows:

1. A fire-protective thermal barrier comprising a cured thermosetting synthetic resinous material having dispersed therein an effective amount of a finely divided, crystalline, hydrated inorganic salt extender, sufficient to provide a predetermined level of fire resistance as specifically determined by ASTM E-119-76 or other fire resistance testing procedures, said hydrated extender being characterized by having at least 35% by weight water of crystallization, the major portion of which is released upon heating to a temperature in the range from about 200° F. but below 600° F.

2. The fire-protective thermal barrier of claim 1 wherein said hydrated extender is selected from the group consisting of hydrated salts of Group II A elements of the Periodic Table, and said thermosetting resinous material is selected from the group consisting of a polyester, polyurethane, polyacrylate, epoxy and urea-formaldehyde resin.

3. The fire-protective thermal barrier of claim 1 wherein said thermal barrier includes catalysts promoters, viscosity modifiers and pigments.

4. The fire-protective thermal barrier of claim 1 including in addition to said hydrated extender, an inorganic particulate filler in an amount from about 1 part by wt to about 15 parts by weight per 100 part of thermal barrier.

5. The fire-protective thermal barrier of claim 2 wherein said hydrated salts are selected from the group consisting of magnesium sulfate heptahydrate, magnesium sulfite, and magnesium monohydroorthophosphate.

6. The fire-protective thermal barrier of claim 5 wherein said magnesium sulfate heptahydrate ($MgSO_4.7H_2O$) is present in an amount from about 30 parts to about 80 parts by weight per 100 parts of mixed resin an hydrated extender.

7. The fire-protective thermal barrier of claim 1 further charactized, in that it is essentially impermeable to moisture, said thermal barrier in a thickness of 0.135 inch having a perm rating of 0.0295 as determined by testing procedure designated ASTM E 96-66, and impact resistance in excess of about 20 inch pounds as determined by the Gardner Drop Dart test.

8. A fire-protective insulating laminate comprising a foam plastic and bonded thereto a thermal barrier comprising a cured thermosetting synthetic resinous material having dispersed therein an effective amount of a finely divided, crystalline, hydrated inorganic salt extender, sufficient to provide a predetermined level of fire resistance as determined specifically by a testing procedure designated ASTM E-119-76, or other fire resistance testing procedures, said hydrated extender being characterized by having at least 35% by weight water of crystallization, the major portion of which is released upon heating to a temperature in the range from about 200° F. but below 600° F.

9. The fire-protective laminate of claim 8 wherein said hydrated extender is selected from the group consisting of hydrated salts of Group II A elements of the Periodic Table, and said thermosetting synthetic resinous material is selected from the group consisting of a polyester, polyurethane, polyacrylate, epoxy, and urea-formaldehyde resin.

10. The fire-protective laminate of claim 8 including in addition to said hydrated extender, an inorganic particulate filler in an amount from about 1 part by weight to about 15 parts by weight per 100 parts of thermal barrier.

11. The fire-protective laminate of claim 8 wherein said thermal barrier includes catalysts, promoters, viscosity modifiers and pigments.

12. The fire-protective laminate of claim 8 wherein said foam plastic is a synthetic material selected from the group consisting of a polyurethane foam, a polyisocyanurate foam, a urea-formaldehyde foam, and a polystyrene foam.

13. The fire-protective laminate of claim 9 wherein said hydrated salts are selected from the group consisting of magnesium sulfate heptahydrate, magnesium sulfite, and magnesium monohydroorthophosphate.

14. The fire-protective laminate of claim 13 wherein said magnesium sulfate heptahydrate ($MgSO_4.7H_2O$) is present in an amount from about 30 parts to about 80 parts by weight per 100 parts of mixed resin and hydrated extender.

15. The fire-protective laminate of claim 10 wherein said foam plastic and said thermal barrier are each selectively field-applied.

16. The fire-protective laminate of claim 8 wherein said foam plastic consists essentially of a synthetic resinous material selected from the group consisting of a polyurethane foam, a polyisocyanurate foam, a urea-formaldehyde foam, and a polystyrene foam.

17. The fire-protective laminate of claim 8 wherein said thermal barrier is self-adhered to said foam plastic.

18. A fire-protective insulating panel comprising an inner and outer skin and a laterally coextensive laminate bonded thereto, said laminate comprising a foam plastic and bonded to one side a thermal barrier comprising a cured thermosetting synthetic resinous material having dispersed therein an effective amount of a finely divided, crystalline, hydrated inorganic salt extender, sufficient to provide a predetermined level of fire resistance as specifically determined by testing procedure designated ASTM E-119-76, or other fire resistance testing procedures, said hydrated extender being characterized by having at least 35% by weight of crystallization, the major portion of which is released upon heating to a temperature in the range from about 200° F. but below 600° F.

19. The fire-protective insulating panel of claim 18 including in addition, an inner and outer skin and a laterally coextensive laminate bonded thereto, said laminate comprising a foam plastic and bonded to each side a first and second thermal barrier, said second thermal barrier being of similar composition to said first thermal barrier.

20. A spraying or flowing method for forming a fire-protective laminate comprising a foam plastic and, bonded thereto, a thermal barrier comprising a mixture of liquid thermosetting synthetic resin and said inorganic material dispersed therein, said method comprising:
(a) admixing into said liquid resin from about 30 parts to about 80 parts by weight of a hydrated inorganic salt extender consisting essentially of a hydrated salt of a Group II A element, said hydrated salt being present in the size range from about 10 U.S. Standard mesh to about 325 mesh,
(b) admixing into said liquid resin sufficient catalyst to provide cured resin in a predetermined period of time, and
(c) bonding said resin to a foam plastic to form said laminate, so as to provide said laminate with fire resistant properties sufficient to meet the requirements as determined by a testing procedure designated ASTM E-119-76 or other fire resistance testing procedures.

21. The method of claim 20 including continuously forming a building panel having a foam plastic core comprising applying a predetermined thickness of said resin, including catalyst, heating said thickness of resin to effect an incomplete cure, and foaming said foam plastic in place on said resin prior to said resin being fully cured, so as subsequently to effect bonding of said foam plastic to said cured resin.

22. The method of claim 20 comprising applying said thermal barrier to foam plastic board stock.

23. The method of claim 20 comprising spraying said thermal barrier in a fluent state on foam plastic which is applied to walls, ceilings, decks, roofs and the exterior surfaces of tanks, vessels and pipes.

* * * * *